United States Patent [19]

Dieck et al.

[11] 4,026,838

[45] May 31, 1977

[54] SMOKE-SUPPRESSANT ADDITIVES FOR POLYPHOSPHAZENES

[75] Inventors: Ronald L. Dieck; Edwin J. Quinn, both of Lancaster, Pa.

[73] Assignee: Armstrong Cork Company, Lancaster, Pa.

[22] Filed: Aug. 6, 1976

[21] Appl. No.: 712,149

[52] U.S. Cl. ............................ 260/2.5 FP; 260/2 P; 260/2.5 R; 260/30.4 R; 260/32.6 R; 260/33.6 R; 260/37 R; 260/46.5 Y; 260/47 P; 260/48; 260/874; 428/411

[51] Int. Cl.$^2$ ........................................... C08J 9/10

[58] Field of Search .............. 260/2 P, 47 P, 2.5 R, 260/2.5 FP

[56] References Cited

UNITED STATES PATENTS 3,856,712  12/1974  Reynord et al. .................. 260/2 P
3,856,713  12/1974  Rose et al. ........................ 260/2 P

*Primary Examiner*—Morton Foelak

[57] ABSTRACT

Smoke suppressant additives for poly(aryloxyphosphazene) homopolymers, copolymers and foams thereof are described. Smoke suppression occurs by the incorporation of an effective amount of a normally solid carboxylic acid.

14 Claims, No Drawings

SMOKE-SUPPRESSANT ADDITIVES FOR POLYPHOSPHAZENES

BACKGROUND OF THE INVENTION

1. Field of the Invention

This invention relates to elastomeric poly(aryloxyphosphazene) homopolymeric and copolymeric compositions, to flexible and semirigid foams produced from said homopolymeric and copolymeric compositions, and to a process for preparing these materials. These compositions exhibit excellent smoke suppressant properties as a result of having incorporated therein an effective amount of a normally solid carboxylic acid. Foams prepared from the compositions also produce low smoke levels, or essentially no smoke, when heated in an open flame. All of the homopolymeric and copolymeric compositions described may be cross-linked at moderate temperatures in the presence of free radical initiators, and the copolymers containing reactive unsaturation additionally may be cured by conventional sulfur curing or vulcanizing additives to modify their properties and expand their field of use.

2. Description of the Prior Art

The preparation of poly(aryloxyphosphazene) polymers has been disclosed in U.S. Pat. No. 3,856,712 to Reynard et al; U.S. Pat. No. 3,856,713 to Rose et al; and U.S. Pat. No. 3,883,451 to Reynard et al. The copolymers described in the first-mentioned Reynard et al patent contain selected quantities of both alkoxy and aryloxy side chains in the copolymer backbone, whereas the copolymers described in the latter-mentioned Reynard et al patent are characterized by the presence of halogen-substituted aryl side chains in the copolymer backbone. Other related art may be found in U.S. Pat. Nos. 3,515,688; 3,700,629; 3,702,833; 3,856,712; and Ser. No. 661,862 filed Feb. 27, 1976.

Many of these prior art homopolymers and copolymers are noted for their high smoke-forming properties which severely limits their range of application.

SUMMARY OF THE INVENTION

It is, therefore, an object of the present invention to provide low smoke-generating compositions comprising aryloxyphosphazene homopolymers and copolymers containing an effective amount of a smoke suppressing solid carboxylic acid.

It is a further object of the present invention to provide low smoke-generating compositions comprising an elastomeric aryloxyphosphazene homopolymeric or copolymeric foam containing an effective amount of smoke suppressing solid carboxylic acid.

These and other objects of the present invention will become more apparent to those skilled in the art upon reading the more detailed description set forth hereinbelow.

DESCRIPTION OF THE PREFERRED EMBODIMENTS

The essential component of the novel low smoke compositions is a normally solid carboxylic acid. The term "normally solid", as used herein, refers to the physical property of the smoke suppressant material, such being as a solid (crystalline, amorphous and the like) at ambient temperatures. The carboxylic acids may be any of the known mono or polycarboxylic acids falling into this class of normally solid carboxylic acids. Thus, aromatic monocarboxylic acids, substituted aromatic monocarboxylic acids, and mixtures thereof are useful herein. Polynuclear homologs, as well as the completely saturated homologs, can also be used as smoke suppressants in accordance with the present invention. Normally solid aliphatic, unsaturated aliphatic, aryl substituted aliphatic, cycloaliphatic, heterocycloaliphatic monocarboxylic acids, and mixtures thereof are also effective herein. Polycarboxylic acids analogous to the above-disclosed monocarboxylic acids are also useful in accordance with the present invention.

Illustrative of the normally solid aromatic carboxylic acids which may be used are:

Benzoic acid
o-Toluic acid
m-Toluic acid
p-Toluic acid
o-Chlorobenzoic acid
m-Chlorobenzoic acid
p-Chlorobenzoic acid
o-Bromobenzoic acid
m-Bromobenzoic acid
p-Bromobenzoic acid
o-Nitrobenzoic acid
m-Nitrobenzoic acid
p-Nitrobenzoic acid
3,5-Dinitrobenzoic acid
Salicylic acid
m-Hydroxybenzoic acid
p-Hydroxybenzoic acid
Anisic acid
Gallic acid
Syringic acid
Anthranilic acid
m-Aminobenzoic acid, and
p-Aminobenzoic acid.

Polynuclear monocarboxylic acids useful herein are illustrated by:

α-naphthoic acid
β-naphthoic acid
9-phenanthroic acid
10-phenanthroic acid
9-anthroic acid
10-anthroic acid
1,12-benzperylene-1'-carboxylic acid.

Normally solid polycarboxylic acids useful as smoke suppressant additives in accordance with the present invention are illustrated by:

Diphenic acid
Phthalic acid
Isophthalic acid
Terephthalic acid
1,12-benzperylene-1',2'-dicarboxylic acid
Hemimellitic acid
Trimellitic acid
Trimesic acid
Prehnitic acid
Mellophanic acid
Pyromellitic acid
Benzenepentacarboxylic acid
Mellitic acid
Aurintricarboxylic acid Aliphatic saturated and unsaturated carboxylic acids useful as smoke suppressant additives herein are illustrated by:

Trimethylacetic acid
Fluoroacetic acid
Chloroacetic acid
Bromoacetic acid
Iodoacetic acid
Trichloroacetic acid
β-Chloropropionic acid
Glycolic acid
Cyanoacetic acid
Capric acid
Lauric acid
Myristic acid
Palmatic acid
Stearic acid, and
Ricinoleic acid
Gluconic acid
Leucinic acid Aryl substituted aliphatic monocarboxylic acids include:

Phenylacetic acid
Hydrocinnamic acid
γ-Phenylbutyric acid
δ-Phenyl-n-valeric acid
ε-Phenyl-n-caproic acid
Cinnamic (trans) acid
Phenylpropiolic acid Cycloaliphatic and heterocycloaliphatic monocarboxylic acids include:

Cyclopentane carboxylic acid
Cyclohexane carboxylic acid
Tetrahydrofurane carboxylic acids
Thiophene carboxylic acid Normally solid aliphatic and substituted aliphatic polycarboxylic acids useful in accordance with the present invention are illustrated by:

Homophthalic acid
o-Phenylenediacetic acid
m-Phenylenediacetic acid
p-Phenylenediacetic acid
o-Phenyleneacetic-β-propionic acid
Oxalic acid
Malonic acid
Succinic acid
Glutaric acid
Adipic acid
Pimelic acid
Suberic acid
Azelaic acid
Sebacic acid
Fumaric acid
Cyclopentane dicarboxylic acids (cis and trans)
Cyclohexane dicarboxylic acids (cis and trans) and
2,3,4,5-Tetrahydrofurane tetracarboxylic acid It has been discovered that additions of the above smoke suppressants in from about 1 to about 10 percent by weight and preferably from about 1 to about 3 percent by weight based on the phosphazene content, reduce smoke generation by a significant amount. The terms percent and parts as used hereafter in this specification refer to percent and parts by weight unless otherwise indicated.

The aryloxyphosphazene homopolymers and copolymers useful in accordance with this invention are characterized by repeating

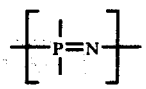

units which contain substituted aryloxy-substituents (preferably substituted in the para position) on the phosphorous atoms in nonregular fashion and which can be represented by the following formulas:

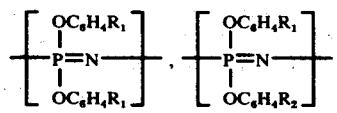

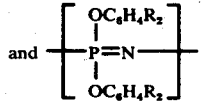

wherein $R_1$ and $R_2$ are the same or different and are hydrogen, a $C_1$–$C_{10}$ linear or branched alkyl radical or a $C_1$–$C_4$ linear or branched alkoxy radical, substituted in any sterically permissible position on the phenoxy group. Examples of $R_1$ and $R_2$ include methyl, methoxy, ethyl, ethoxy, n-propyl, n-propoxy, isopropyl, isopropoxy, sec-butyl, sec-butoxy, tert-butyl, t-butoxy, t-pentyl, 2-ethylhexyl and n-nonyl.

It is to be understood that while it is presently preferred that all $R_1$'s are the same and all $R_2$'s are the same, the $R_1$ can be mixed and the $R_2$ can be mixed. The mixtures may be mixtures of different alkyl and/or alkoxy radicals or mixtures of different ortho-, meta- and para- isomers. One skilled in the art readily will recognize that steric hindrance will dictate the propriety of using relatively bulky groups in the para position on the phenoxy ring since, as set forth hereinafter, the polymers are made by reacting a substituted metal phenoxide with a chlorine atom on a phosphorous atom. Desirably, groups which sterically inhibit this reaction should be avoided. Absent the foregoing proviso, the selection of the various $R_1$'s and $R_2$'s will be apparent to anyone skilled in the art based upon this disclosure.

For the sake of simplicity, where $R_1$ and $R_2$ are different, the polymers of the invention which contain the above three repeating units may be represented by the formula $[NP(OC_6H_4-R_1)_a(OC_6H_4-R_2)_b]_n$, wherein $n$ is from about 20 to about 2000 or more, and wherein $a$ and $b$ are greater than zero and $a+b=2$.

The above-described polymers and copolymers, as well as those containing reactive sites designated as W below, may be crosslinked and/or cured at moderate temperatures (for example, 200°–350° F.) by the use of free radical initiators, for example, peroxides, using conventional amounts, techniques and processing equipment.

The polymers of this invention may contain small amounts of randomly distributed repeating units in addition to the repeating units described above. Examples of these additional repeating units are:

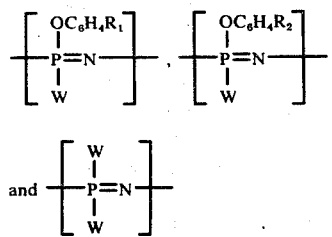

wherein W represents a group capable of a crosslinking chemical reaction, such as, an olefinically unsaturated, preferably ethylinically unsaturated monovalent radical, containing a group capable of further reaction at relatively moderate temperatures. When $R_1 = R_2$, it is preferred to have the ratio $W:[OC_6H_4R_1]$ less than 1:5. When $R_1$ and $R_2$ are different, it is preferred to have the ratio of $W:[(-OC_6H_4-R_1) + (OC_6H_4-R_2)]$ less than about 1:5. For the sake of simplicity, the compositions of this invention which are further reactive may be represented by the formulas $[NP(OC_6H_4-R_1)_a(W)_c]_n$ and $[NP(OC_6H_4-R_1)_a(OC_6H_4-R_2)_b(W)_c]_n$, wherein $W, R_1, R_2, n, a$ and $b$ are as set forth above, and wherein $a + b = 2$. When $a$ is present alone, $a = 2$. Examples of W are

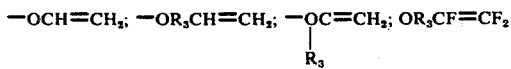

and similar groups which contain unsaturation, where $R_3$ is any aliphatic or aromatic radical, especially $-CH_2-$. These groups are capable of further reaction at moderate temperatures (for example, 200°–350° F.) in the presence of free radical initiators, conventional sulfur curing or vulcanizing additives known in the rubber art or other reagents, often even in the absence of accelerators, using conventional amounts, techniques and processing equipment.

Examples of free radical initiators include benzoyl peroxide, bis(2,4-dichlorobenzoyl peroxide), di-tert-butyl peroxide, dicumyl peroxide, 2,5-dimethyl(2,5-di-tert-butylperoxy)hexane, t-butyl perbenzoate, 2,5-dimethyl-2,5-di(tert-butyl peroxy) hepyne-3, and 1,1-bis(tert-butylperoxy)-3,3,5-trimethylcyclohexane. Thus, the general peroxide classes which may be used for crosslinking include diacyl peroxides, peroxyesters, and dialkyl peroxides.

Examples of sulfur-type curing systems include vulcanizing agents such as sulfur; sulfur monochloride; selenium, tellurium, and thiuram disulfides; p-quinone dioximes; polysulfide polymers; and alkyl phenol sulfides. The above vulcanizing agents may be used in conjunction with accelerators, such as aldehyde amines, thiocarbamates, thiuram sulfides, quanidines, and thiazols, and accelerator activators, such as zinc oxide or fatty acids, e.g., stearic acid.

It is also possible to use as W in the above formulas monovalent radicals represented by the formulas (1) $-OSi(OR^4)_2R^5$ and other similar radicals which contain one or more reactive groups attached to silicon; (2) $-OR^6NR^6H$ and other radicals which contain reactive $-NH$ linkages. In these radicals $R^4$, $R^5$ and $R^6$ each represent aliphatic, aromatic and acyl radicals. Like the groups above, these groups are capable of further reaction at moderate temperatures in the presence of compounds which effect crosslinking. The presence of a catalyst to achieve a cure is often desirable. The introduction of groups such as W into polyphosphazene polymers is shown in U.S. Pat. Nos. 3,888,799; 3,702,833 and 3,844,983, which are hereby incorporated by reference.

Where $R_1$ and $R_2$ are different, the ratio of $a:b$, and of $(a+b):c$ where units containing W are present in the copolymer, affects the processability, smoke production, glass transition temperature and a number of other properties of the compositions of this invention. These ratios also affect the ability to be foamed and the properties, such as the rigidity, or the resulting foams. For example, it has been found that an increase in the mole percent of $R_1$ as alkoxy when $R_2$ is alkyl decreases the amount of smoke generated when these copolymers are subjected to an open flame. It has been found, also, that as the mole percent of $R_1$ as alkoxy when $R_2$ is alkyl approaches 100 percent, the crystallinity of the copolymers increases and their ability to be foamed diminishes. Similarly, it has been found that when the mole percent of W increases, the degree of crosslinking increases and the ability to be foamed diminishes. Accordingly, it is contemplated that the copolymeric compositions of this invention contain a mole ratio of $a:b$ of at least about 1:6 and up to about 6:1, and preferably between about 1:4 and 4:1. It is also contemplated that the mole ratio of $c:(a+b)$ will be less than about 1:5, preferably from about 1:50 to about 1:10. When $R_1$ and $R_2$ are the same, $a=b$ and $c:2a$ (or $c:2b$) is from about 1:50 to about 1:10.

In one embodiment, the polymers of this invention may be prepared in accordance with the process described in U.S. Pat. No. 3,370,020 to Allcock et al, which description is incorporated herein by reference. Accordingly, the polymers of this invention may be prepared by a multistep process wherein the first step comprises thermally polymerizing a compound having the formula

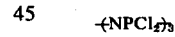

by heating it at a temperature and for a length of time ranging from about 200° C. for 48 hours to 300° C. for 30 minutes; preferably in the absence of oxygen, and most preferably in the presence of a vacuum of at least $10^{-1}$ Torr. That is to say, the compounds are heated to a temperature ranging from about 200° C. to about 300° C. for from about 30 minutes to 48 hours, the higher temperatures necessitating shorter contact times and the lower temperatures necessitating longer contact times. The compounds must be heated for such a length of time that only a minor amount of unreacted charge material remains and a major amount of high polymer has been produced. Such a result is generally achieved by following the conditions of temperature and contact time specified above.

It is preferred that the thermal polymerization be carried out in the presence of an inert gas such as nitrogen, neon, argon or a vacuum, e.g., less than about $10^{-1}$ Torr inasmuch as the reaction proceeds very slowly in the presence of air. The use of such a gas, however, is not critical.

The polymers resulting from the thermal polymerization portion of the process are in the form of a polymeric mixture of different polymers of different chain lengths. That is to say, the product of the thermal polymerization is a mixture of polymers having the formula $$-(NPCl_2)_n$$

wherein $n$ ranges from about 20 to about 2000. For example, the recovered media may contain minor amounts of a polymer where $n$ is 20 and major amounts of polymer where $n$ is 2000. The media may also contain polymers composed of from 21–1999 recurring units and some unreacted trimer. The complete mixture of polymers and unreacted trimer constitutes the charge to the second step of the process.

The second or esterification step of the process comprises treating the mixture resulting from the thermal polymerization step with a mixture of compounds having the formulas $M(OC_6H_4-R_1)_x$,
$M(OC_6H_4-R_2)_x$, and, if desired,
$M(W)_x$, wherein M is lithium, sodium, potassium, magnesium or calcium, $x$ is equal to the valence of metal M, and $R_1$, $R_2$ and W are as specified above.

The polymer mixture is reacted with the mixture of metal compounds at a temperature and a length of time ranging from about 25° C. for 7 days to about 200° C. for 3 hours.

Again, as in regard to the polymerization step mentioned above, the polymer mixture is reacted with the alkali or alkaline earth metal compounds at a temperature ranging from about 25° C. to about 200° C. for from about 3 hours to 7 days, and the lower temperatures necessitating the longer reaction times and the higher temperatures allowing shorter reaction times. These conditions are, of course, utilized in order to obtain the most complete reaction possible, i.e., in order to insure the complete conversion of the chlorine atoms in the polymer mixture to the corresponding ester of the alkali or alkaline earth starting materials.

The above esterification step is carried out in the presence of a solvent. The solvent employed in the esterification step must have a relatively high boiling point (e.g., about 115° C., or higher) and should be a solvent for both the polymer and the alkali or alkaline earth metal compounds. In addition, the solvent must be substantially anhydrous, i.e., there must be no more water in the solvent or metal compounds than will result in more than 1%, by weight, of water in the reaction mixture. The prevention of water in the system is necessary in order to inhibit the reaction of the available chlorine atoms in the polymer therewith. Examples of suitable solvents include diglyme, triglyme, tetraglyme, toluene and xylene. The amount of solvent employed is not critical and any amount sufficient to solubilize the chloride polymer mixture can be employed. Either the polymer mixture or the alkaline earth (or alkali) metal compounds may be used as a solvent solution thereof in an inert, organic solvent. It is preferred, however, that at least one of the charge materials be used as a solution in a compound which is a solvent for the polymeric mixture.

The combined amount of the mixture of alkali metal or alkaline earth metal compounds employed should be at least molecularly equivalent to the number of available chlorine atoms in the polymer mixture. However, it is preferred that an excess of the metal compounds be employed in order to assure complete reaction of all the available chlorine atoms. Generally, the ratio of the individual alkali metal or alkaline earth metal compounds in the combined mixture governs the ratio of the groups attached to the polymer backbone. However, those skilled in the art readily will appreciate that the nature and, more particularly, the steric configuration of the metal compounds employed may effect their relative reactivity. Accordingly, the ratio of $R_1$'s and/or $R_2$'s in the esterified product, if necessary, may be controlled by employing a stoichiometric excess of the slower reacting metal compound.

Examples of alkali or alkaline earth metal compounds which are useful in the process of the present invention include:

sodium phenoxide
potassium phenoxide
sodium p-methoxyphenoxide
sodium o-methoxyphenoxide
sodium m-methoxyphenoxide
lithium p-methoxyphenoxide
lithium o-methoxyphenoxide
lithium m-methoxyphenoxide
potassium p-methoxyphenoxide
potassium o-methoxyphenoxide
potassium m-methoxyphenoxide
magnesium p-methoxyphenoxide
magnesium o-methoxyphenoxide
magnesium m-methoxyphenoxide
calcium p-methoxyphenoxide
calcium o-methoxyphenoxide
calcium m-methoxyphenoxide
sodium p-ethoxyphenoxide
sodium o-ethoxyphenoxide
sodium m-ethoxyphenoxide
potassium p-ethoxyphenoxide
potassium o-ethoxyphenoxide
potassium m-ethoxyphenoxide
sodium p-n-butoxyphenoxide
sodium m-n-butoxyphenoxide
lithium p-n-butoxyphenoxide
lithium m-n-butoxyphenoxide
potassium p-n-butoxyphenoxide
potassium m-n-butoxyphenoxide
magnesium p-n-butoxyphenoxide
magnesium m-n-butoxyphenoxide
calcium p-n-butoxyphenoxide
calcium m-n-butoxyphenoxide
sodium p-n-propoxyphenoxide
sodium o-n-propoxyphenoxide
sodium m-n-propoxyphenoxide
potassium p-n-propoxyphenoxide
potassium o-n-propoxyphenoxide
potassium m-n-propoxyphenoxide
sodium p-methylphenoxide
sodium o-methylphenoxide
sodium m-methylphenoxide
lithium p-methylphenoxide
lithium o-methylphenoxide
lithium m-methylphenoxide
sodium p-ethylphenoxide
sodium o-ethylphenoxide
sodium m-ethylphenoxide
potassium p-n-propylphenoxide
potassium o-n-propylphenoxide potassium m-n-propylphenoxide
magnesium p-n-propylphenoxide
sodium p-isopropylphenoxide
sodium o-isopropylphenoxide
sodium m-isopropylphenoxide
calcium p-isopropylphenoxide
calcium o-isopropylphenoxide
calcium m-isopropylphenoxide
sodium p-sec butylphenoxide
sodium m-sec butylphenoxide
lithium p-sec butylphenoxide
lithium m-sec butylphenoxide
lithium p-tert. butylphenoxide
lithium m-tert. butylphenoxide
potassium p-tert. butylphenoxide
potassium m-tert. butylphenoxide
sodium p-tert. butylphenoxide
sodium m-tert. butylphenoxide
sodium propeneoxide
sodium p-nonylphenoxide
sodium m-nonylphenoxide
sodium o-nonylphenoxide
sodium 2-methyl-2-propeneoxide
potassium buteneoxide and the like.

The second step of the process results in the production of a polymer mixture having the formula

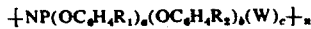

wherein $n$, $R_1$, $R_2$ and $W$ are as specified above, where $c$ and $b$, but not $a$ can be zero, and where $a + b + c = 2$, and the corresponding metal chloride salt.

The polymeric reaction mixture resulting from the second or esterification step is then treated to remove the salt which results upon reaction of the chlorine atoms of the copolymer mixture with the metal of the alkali or alkaline earth metal compounds. The salt can be removed by merely precipitating it out and filtering, or it may be removed by any other applicable method, such as by washing the reaction mixture with water after neutralization thereof with, for example, an acid such as hydrochloric acid.

The next step in the process comprises fractionally precipitating the polymeric material to separate out the high polymer from the low polymer and any unreacted trimer. The fractional precipitation is achieved by the, preferably dropwise, addition of the esterified polymer mixture to a material which is a non-solvent for the high polymer and a solvent for the low polymer and unreacted trimer. That is to say, any material which is a non-solvent for the polymers wherein $n$ is higher than 350 and a solvent for the remaining low polymers may be used to fractionally precipitate the desired polymers. Examples of materials which can be used for this purpose include hexane, diethyl ether, carbon tetrachloride, chloroform, dioxane, methanol, water and the like. The fractional precipitation of the esterified homopolymeric or copolymeric mixture generally should be carried out at least twice and preferably at least four times in order to remove as much of the low polymer from the polymer mixture as possible. The precipitation may be conducted at any temperature, however, it is preferred that room temperature be employed. The novel high molecular weight homopolymer or copolymer mixture may then be recovered by filtration, centrifugation, decantation or the like.

The novel compositions of this invention, as mentioned above, are very thermally stable. The mixtures are soluble in specific organic solvents such as tetrahydrofuran, benzene, xylene, toluene, dimethylformamide and the like, and can be formed into films from solutions of the copolymers by evaporation of the solvent. The polymers are water resistant at room temperature and do not undergo hydrolysis at high temperatures. The polymers may be used to prepare films, fibers, coatings, molding compositions and the like. They may be blended with such additives as antioxidants, ultraviolet light absorbers, lubricants, plasticizers, dyes, pigments, fillers such as litharge, magnesia, calcium carbonate, furnace black, alumina trihydrate and hydrated silicas, other resins, etc., without detracting from the scope of the present invention.

The polymers may be used to prepare foamed products which produce low smoke levels, or essentially no smoke when heated in an open flame. The foamed products may be prepared from filled or unfilled formulations using conventional foam techniques with chemical blowing agents, i.e. chemical compounds stable at original room temperature which decompose or interact at elevated temperatures to provide a cellular foam. Suitable chemical blowing agents include:

| Blowing Agent | Effective Temperature Range °C. |
|---|---|
| Azobisisobutyronitrile | 105–120 |
| Azo dicarbonamide (1,1-azobisform-amide) | 100–200 |
| Benzenesulfonyl hydrazide | 95–100 |
| N,N'-dinitroso-N,N'-dimethyl terephthalamide | 100 |
| Dinitrosopentamethylenetetramine | 130–150 |
| Ammonium carbonate | 58 |
| p,p'-oxybis-(benzenesulfonyl-hydrazide) | 100–200 |
| Diazo aminobenzene | 84 |
| Urea-biuret mixture | 90–140 |
| 2,2'-azo-isobutyronitrile | 90–140 |
| Azo hexahydrobenzonitrile | 90–140 |
| Diisobutylene | 103 |
| 4,4'-diphenyl disulfonylazide | 110–130 |

Typical foamable formulations include:

| | | |
|---|---|---|
| Phosphazene copolymer e.g., [NP(OC$_6$H$_5$) (OC$_6$H$_4$-p-OCH$_3$)]$_n$ | 100 | parts |
| Smoke suppressing agent (normally solid carboxylic acid) | 1–10 | phr |
| Filler (e.g., alumina trihydrate) | 0–100 | phr |
| Stabilizer (e.g., magnesium oxide) | 2.5–10 | phr |
| Processing aid (e.g., zinc stearate) | 2.5–10 | phr |
| Plasticizer resin (e.g., Cumar P-10, coumarone indene resin) | 0–50 | phr |
| Blowing agent (e.g., 1,1'-azobisform-amide) | 10–50 | phr |
| Activator (e.g., oil-treated urea) | 10–40 | phr |
| Peroxide curing agent (e.g., 2,5-dimethyl-2,5-di(t-butylperoxy) hexane) | 2.5–10 | phr |
| Peroxide curing agent (e.g., benzoyl peroxide) | 2.5–10 | phr |

While the above are preferred formulation guidelines, obviously some or all of the adjuvants may be omitted, replaced by other functionally equivalent materials, or the proportions varied, within the skill of the art of the foam formulator.

In one suitable process, the foamable ingredients are blended together to form a homogeneous mass; for example, a homogeneous film or sheet can be formed on a 2-roller mill, preferably with one roll at ambient temperature and the other at moderately elevated temperature, for example 100°–120° F. The homogeneous foamable mass can then be heated, to provide a foamed structure; for example, by using a mixture of a curing agent having a relatively low initiating temperature, such as benzoyl peroxide, and a curing agent having a relatively high initiating temperature, such as 2,5-dimethyl-2,5-di(t-butylperoxy) hexane, and partially pre-curing in a closed mold for about 6–30 minutes at 200°–250° F., followed by free expansion for 30–60 minutes at 300°–350° F. In the alternative, the foaming may be accomplished by heating the foamable mass for 30–60 minutes at 300°–350° F. using a high temperature or low temperature curing agent, either singly or in combination. One benefit of utilizing the "partial pre-cure" foaming technique is that an increase in the molecular weight of the foamable polymer prior to the foaming step enables better control of pore size and pore uniformity in the foaming step. The extent of "pre-cure" desired is dependent upon the ultimate foam characteristics desired. The desired foaming temperature is dependent on the nature of the blowing agent and the crosslinkers present. The time of heating is dependent on the size and shape of the mass being foamed. The resultant foams are generally light tan to yellowish in appearance, and vary from flexible to semirigid, depending upon the glass transition temperature of the copolymer employed in the foam formulation, that is to say, the lower the glass transition of the polymer the more flexible will be the foam produced therefrom. As indicated, inert, reinforcing or other fillers such as alumina trihydrate, hydrated silicas or calcium carbonate can be added to the copolymer foams and the presence of these and other conventional additives should in no way be construed as falling outside the scope of this invention.

Also, as mentioned above, the copolymers of this invention can be crosslinked at moderate temperatures by conventional free radical and/or sulfur curing techniques when minor amounts of unsaturated groups W are present in the copolymer backbone. The ability of these copolymers to be cured at temperatures below about 350° F. makes them particularly useful as potting and encapsulation compounds, sealants, coatings and the like. These copolymers are also useful for preparing crosslinked foams which exhibit significantly increased tensile strengths over uncured foams. These copolymers are often crosslinked in the presence of inert, reinforcing or other fillers and the presence of these and other conventional additives are deemed to be within the scope of this invention.

The following examples are set forth for purposes of illustration only and are not to be construed as limitations of the present invention except as set forth in the appended claims. All parts and percentages are by weight unless otherwise indicated.

EXAMPLE 1

Preparation of $+NPCl_2+_n$ 250 parts of phosphonitrilic chloride trimer, previously recrystallized from n-heptane, were degassed and sealed in a suitable, thick-walled reaction vessel at $10^{-2}$ Torr and heated to 250° C. for 6 hours. Polymerization was terminated at this time since a glass ball, one-half inch in diameter ceased to flow due to the increased viscosity of the molten mass, when the vessel was inverted. Termination was effected by cooling the vessel to room temperature. The resulting polymeric mixture was then dissolved in toluene to form an anhydrous solution.

EXAMPLE 2

Preparation of Poly(aryloxyphosphazene) Homopolymers and Copolymers

Polyphosphazene homopolymers and copolymers were prepared by a multi-step process beginning with the thermal polymerization process described in Example 1. The resulting solution of poly(dichlorophosphazene) dissolved in toluene was added to a bis(2-methoxyethyl) ether solution of the desired sodium aryloxide salt at 95° C. (Copolymers were prepared by adding the polymer to a solution containing a 1:1 mole ratio of the two desired sodium aryloxide salts.) The reaction temperature was raised to 115°–116° C. and maintained for 50–65 hours with stirring. The thermal polymerization and subsequent reaction are summarized in Equations (1) and (2):

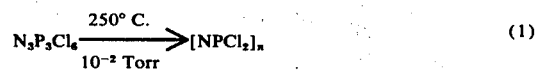

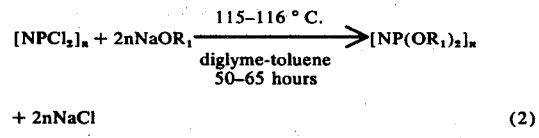

After the reaction was completed, the polymers were precipitated into an excess of methanol, were washed for 24 hours in methanol, and finally were exhaustively washed with distilled water. The polymers ranged from rigid fiber-like materials to elastomers and, except for a few cases, were colorless. The polymers prepared and their glass transition temperatures are listed in the following table. Analytical data were in agreement with the tabulated empirical formulas.

| Poly(aryloxyphosphazenes) and Their Glass Transition Temperatures | |
|---|---|
| Polymer | Tg° C.* |
| $[NP(OC_6H_4\text{-}4\text{-}CH_3)_2]_n$ | +2.0 |
| $[NP(OC_6H_4\text{-}4\text{-}OCH_3)(OC_6H_4\text{-}4\text{-}secC_4H_9)]_n$ | −5.1 |

*Determined by differential scanning calorimetry. The above values are based on Indium standard (melt temperature 156.6° C.).

The following examples set forth phosphazene homopolymeric and copolymeric compositions containing varying amounts of illustrative smoke suppressing agents as disclosed herein and compare their smoke to similar formulations not containing the normally solid carboxylic acids. The smoke values given in these examples were obtained on films of the compositions prepared by mixing and blending the various polymers with the appropriate additives on a 2-roll research mill (30 minutes blending). This was followed by compression molding at 100°–135° C. at pressures of 1000 or 5000 psi. Nominal thickness of these films were 25 ± 5 mils. The films were allowed to remain at ambient conditions for 24–48 hours before die cutting to the required sample sizes for smoke testing, e.g. 3 × 3 × 0.02 to 0.03 inches.

| Examples | [NP(OC$_6$H$_4$-4-R)(OC$_6$H$_4$-4-R')]$_n$ | Concentration % | Carboxylic Acid Additive | Dm (corr) | SV/g | % Smoke Reduction |
|---|---|---|---|---|---|---|
| Comparative | R = CH$_3$; R' = CH$_3$ | — | — | 321 | 68 | 0$^a$ |
| 3 | R = CH$_3$; R' = CH$_3$ | 2 | Trimesic | 230 | 49 | 28.3 |
| Comparative | R = OCH$_3$; R' = sec-C$_4$H$_9$ | — | — | 152 | 32 | 0$^a$ |
| 4 | R = OCH$_3$; R' = sec-C$_4$H$_9$ | 1 | Trimesic | 80 | 16 | 47.4 |
| 5 | R = OCH$_3$; R' = sec-C$_4$H$_9$ | 2 | " | 141 | 28 | 7.2 |
| 6 | R = OCH$_3$; R' = sec-C$_4$H$_9$ | 3 | " | 84 | 15 | 44.7 |
| 7 | R = OCH$_3$; R' = sec-C$_4$H$_9$ | 5 | " | 126 | 24 | 17.1 |
| 8 | R = OCH$_3$; R' = sec-C$_4$H$_9$ | 10 | " | 207 | 42 | 0$^a$ |
| 9 | R = OCH$_3$; R' = sec-C$_4$H$_9$ | 1 | Trimellitic | 123 | 23 | 19.1 |
| 10 | R = OCH$_3$; R' = sec-C$_4$H$_9$ | 3 | " | 135 | 26 | 11.2 |
| 11 | R = OCH$_3$; R' = sec-C$_4$H$_9$ | 5 | " | 101 | 18 | 33.6 |
| 12 | R = OCH$_3$; R' = sec-C$_4$H$_9$ | 1 | 2,3,4,5-Tetrahydrofurane tetracarboxylic | 124 | 25 | 18.4 |
| 13 | R = OCH$_3$; R' = sec-C$_4$C$_9$ | 3 | " | 184 | 36 | 0$^a$ |
| 14 | R = OCH$_3$; R' = sec-C$_4$H$_9$ | 5 | " | 151 | 29 | 0.7 |
| 15 | R = OCH$_3$; R' = sec-C$_4$H$_9$ | 3 | Benzoic | 94 | 19 | 38.1 |
| 16 | R = OCH$_3$; R' = sec-C$_4$H$_9$ | 3 | Fumaric | 132 | 27 | 13.2 |
| 17 | R = OCH$_3$; R' = sec-C$_4$H$_9$ | 3 | Terephthalic | 149 | 25 | 2.0 |
| 18 | R = OCH$_3$; R' = sec-C$_4$H$_9$ | 1 | Mellitic | 92 | 18 | 39.4 |
| 19 | R = OCH$_3$; R' = sec-C$_4$H$_9$ | 2 | " | 97 | 19 | 36.2 |
| 20 | R = OCH$_3$; R' = sec-C$_4$H$_9$ | 3 | " | 139 | 27 | 8.6 |
| 21 | R = OCH$_3$; R' = sec-C$_4$H$_9$ | 5 | " | 150 | 29 | 1.3 |

$^a$No reduction in smoke generation.

The following examples set forth phosphazene homopolymeric and copolymeric foam compositions containing varying amounts of the normally solid carboxylic acid smoke suppressing agents. The foam compositions had the following component concentrations:

| | |
|---|---|
| [NP(OC$_6$H$_4$OCH$_3$)(OC$_6$H$_4$secC$_4$H$_9$)]$_n$ | 100 parts |
| alumina trihydrate | 90 parts |
| zinc stearate | 10 parts |
| magnesium oxide | 5 parts |
| CUMAR P-10 | 2 parts |
| 1,1'-azobisformamide | 20 parts |
| oil treated urea | 5 parts |
| 2,5-dimethyl-2,5-di(t-butylperoxy)hexane | 6 parts |
| benzoyl peroxide | 2 parts |
| dicumyl peroxide | 1 part |
| smoke suppressing agent | varied as disclosed below |

| Example | Normally Solid Carboxylic Acid Additive | Concentration % | Dm (corr) | SV/g | % Smoke Reduction |
|---|---|---|---|---|---|
| Comparative | — | — | 240 | 35 | 0 |
| 22 | Trimesic | 1 | 280 | 39 | 0 |
| 23 | Trimesic | 3 | 150 | 19 | 34.6 |
| 24 | Trimesic | 5 | 185 | 17 | 22.9 |
| 25 | Mellitic | 3 | 177 | 20 | 26.3 |

The above smoke evolution properties of filled and unfilled poly(aryloxyphosphazene) films and foams were evaluated by using an Aminco-NBS Smoke Density Chamber (Model 4-5800, Aminco-NBS Smoke Density Chamber, American Instrument Co.), as described by Gross et al, "A Method of Measuring Smoke Density from Burning Materials", ASTM STP-422 (1967). Samples were tested using the flaming test mode. This small scale test subjects a sample to the two general conditions which prevail in the majority of "real" fires and especially in tunnel tests. In the tests the maximum specific optical density Dm, corrected for soot deposits on the cell windows was measured, and a smoke value per gram, SV/g, or Dm(corr)/g of sample was calculated for the flaming mode. This allows for correction of the smoke density value for its sample weight, since the samples are quite thin. An average Dm(corr) value of 450 as determined in the NBS Smoke Density Chamber has been adopted as a regulation value by the U.S. Department of Health, Education and Welfare, see HEW Publication No. (HRA) 74-4000 (1974). Generally, NBS smoke values of 450 or less are normally required in those fire or code regulations restricting smoke evolution. Values of 200 or less are uncommon for most organic polymers; those less than 100 are quite rare.

What is claimed is:

1. A smoke suppressed poly(aryloxyphosphazene) foam composition comprising a poly(aryloxyphosphazene) foam material; and incorporated in said foam in an amount sufficient to reduce the smoke levels of said foam when burned, a normally solid carboxylic acid.

2. The composition of claim 1 wherein said normally solid carboxylic acid is present in an amount of from about 1% to about 10% by weight of said foam.

3. The composition of claim 1 wherein said normally solid carboxylic acid is present in an amount of from about 1% to about 3% by weight of said foam.

4. The composition of claim 1 wherein said normally solid carboxylic acid is selected from the group consisting of aromatic carboxylic acid, aliphatic carboxylic acid, aryl substituted aliphatic carboxylic acid, cycloaliphatic carboxylic acid, heterocyclic aliphatic acid and mixtures thereof.

5. The composition of claim 1 wherein said normally solid carboxylic acid is selected from the group consisting of trimesic acid, trimellitic acid, 2,3,4,5-tetrahydrofurane tetracarboxylic acid, benzoic acid, fumaric acid, terephthalic acid and mellitic acid.

6. The composition of claim 5 wherein said normally solid carboxylic acid is trimesic acid.

7. The composition of claim 5 wherein said normally solid carboxylic acid is trimellitic acid.

8. The composition of claim 5 wherein said normally solid carboxylic acid is 2,3,4,5-tetrahydrofurane tetracarboxylic acid.

9. The composition of claim 5 wherein said normally solid carboxylic acid is benzoic acid.

10. The composition of claim 5 wherein said normally solid carboxylic acid is fumaric acid.

11. The composition of claim 5 wherein said normally solid carboxylic acid is terephthalic acid.

12. The composition of claim 5 wherein said normally solid carboxylic acid is mellitic acid.

13. A poly(aryloxyphosphazene) smoke suppressed foam composition comprising
  a. an aryloxyphosphazene homopolymer or copolymer of the formula

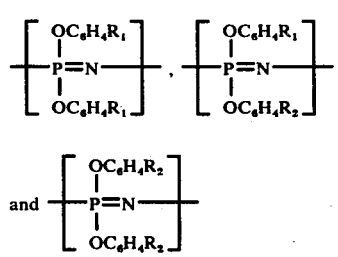

wherein $R_1$ and $R_2$ are the same or different and are hydrogen, a $C_1$–$C_{10}$ linear or branched alkyl radical or a $C_1$–$C_4$ linear or branched alkoxy radical, said $R_1$ and $R_2$ substituted in any sterically permissible position on the phenoxy group; and
  b. a normally solid carboxylic acid.

14. The poly(aryloxyphosphazene) foam composition of claim 13 wherein said aryloxyphosphazene homopolymer or copolymer has randomly repeating units represented by the formula

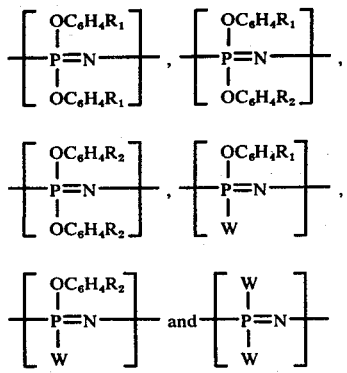

wherein $R_1$ and $R_2$ are the same as before and W is a monovalent radical containing a group capable of crosslinking said group being attached to the phosphorus of the —P=N— radical by an —O— linkage and said normally solid carboxylic acid is aromatic carboxylic acid, aliphatic carboxylic acid, aryl substituted aliphatic carboxylic acid, cycloaliphatic carboxylic acid, heterocyclic aliphatic carboxylic acid, or mixtures thereof.

* * * * *